US008581119B2

(12) United States Patent
Horinaka (10) Patent No.: US 8,581,119 B2
(45) Date of Patent: Nov. 12, 2013

(54) TERMINAL SUPPORTING DEVICE (75) Inventor: Takahiro Horinaka, Takarazuka (JP)

(73) Assignee: Hi-Lex Corporation, Hyogo (JP)

(*) Notice: Subject to any disclaimer, the term of this patent is extended or adjusted under 35 U.S.C. 154(b) by 217 days.

(21) Appl. No.: 12/978,693

(22) Filed: Dec. 27, 2010

(65) Prior Publication Data

US 2011/0155457 A1 Jun. 30, 2011

(30) Foreign Application Priority Data

Dec. 24, 2009 (JP) ................. 2009-292424

(51) Int. Cl.
*H02G 3/18* (2006.01)

(52) U.S. Cl.
USPC .......... 174/659; 174/653; 174/656; 174/657; 174/658

(58) Field of Classification Search
USPC ....................................... 174/659
See application file for complete search history.

(56) References Cited

U.S. PATENT DOCUMENTS

| | | | | |
|---|---|---|---|---|
| 6,511,099 B2 * | 1/2003 | Bartholoma et al. | ...... | 285/140.1 |
| 6,604,400 B1 * | 8/2003 | Gretz | ............. | 72/334 |
| 7,338,087 B2 * | 3/2008 | Bartholoma et al. | .......... | 285/82 |
| 7,563,993 B2 * | 7/2009 | Drotleff et al. | ............... | 174/655 |
| 8,129,634 B2 * | 3/2012 | Sheehan et al. | ............... | 174/666 |

* cited by examiner

*Primary Examiner* — William H Mayo, III
*Assistant Examiner* — Hiram E Gonzalez
(74) *Attorney, Agent, or Firm* — Rahman LLC (57) ABSTRACT The present invention has an object of providing a terminal supporting device which can perform a fixing operation of a cable terminal quickly and easily with a simple configuration. The terminal supporting device of the invention comprises a main body 10, a socket 20, a biasing member 30, a stopper 40, and a lock member 50. The lock member 50 includes a lock body 51 which is arranged movably between a lock position located between the socket 20 and the stopper 40 and a lock release position separated outwardly from a position located between the socket 20 and the stopper 40. The lock body 51 has a fitting projection 54, and the stopper 40 has a fitting depression 42a which fits with the fitting projection 54 of the lock body 51 at the lock position.

18 Claims, 5 Drawing Sheets

TERMINAL SUPPORTING DEVICE

BACKGROUND OF THE INVENTION

The present invention relates to a terminal supporting device for supporting a terminal of a cable by a bracket.

Figure 9:
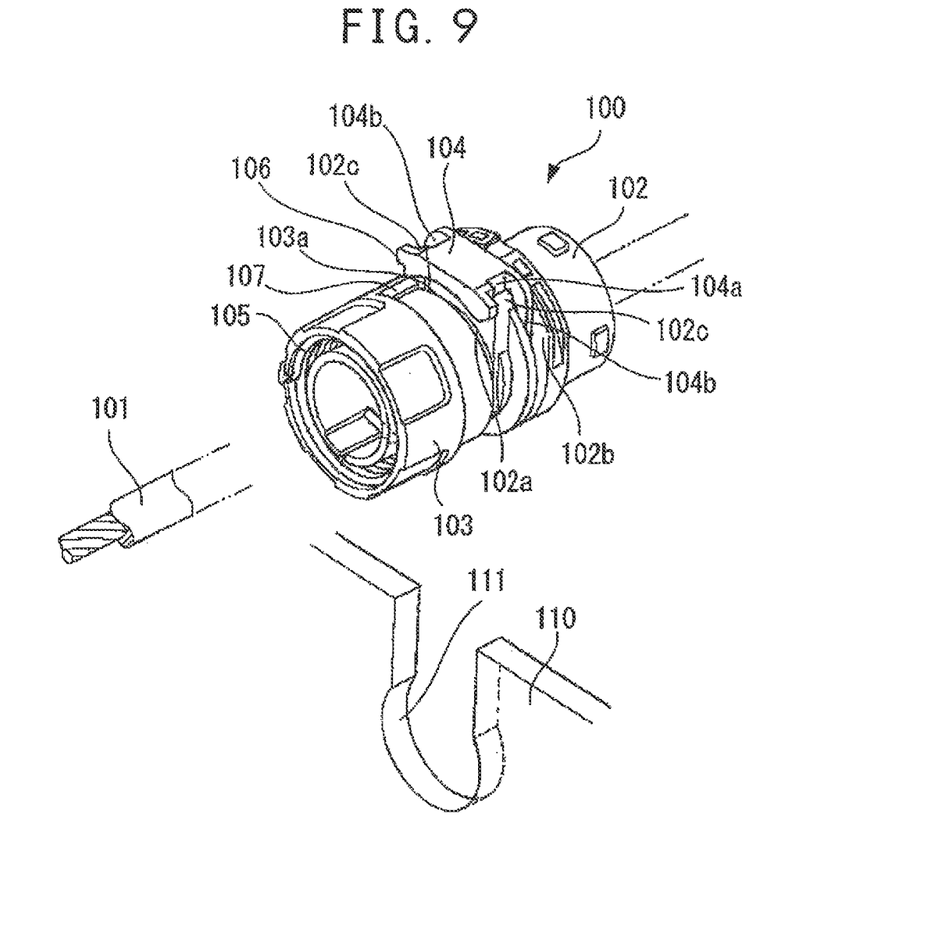
FIG. 9 is a perspective view of a conventional terminal supporting device.

For example, the configuration disclosed in JP 4212832 B2 is known as a device that supports a terminal of a cable such as a control cable for vehicle. As shown in FIG. 9, this terminal supporting device 100 comprises a socket member 102 in which a cable 101 is inserted, a cylindrical nut member 103 set to a male screw 102a of the socket member 102 so as to move back and forth relative to the socket member 102 by a screw, and a stopper 104 which is interposed between a flange portion 102b of the socket member 102 and an end portion 103a of the cylindrical nut member 103 detachably. The cylindrical nut member 103 rotates in a tightening direction under the biasing force of a coil spring 105.

When used, the cylindrical nut member 103 is rotated in a loosening direction against the biasing force of the coil spring 105, and the stopper 104 is interposed between the flange portion 102b of the socket member 102 and the cylindrical nut member 103 to fix the terminal supporting device 100 temporarily. Then, by attaching the terminal supporting device 100, which is temporarily fixed, on a notch 111 formed on an upper edge of the bracket 110 from above, the contact between the cylindrical nut member 103 and the stopper 104 is released by pushing up the stopper 104 and the rim portion of the notch 111 is sandwiched between the cylindrical nut member 103 and the flange portion 102b. After that, by pushing down the stopper 104, a fitting portion 104a of the stopper 104 is fitted between a pair of horned portions 102c, 102c provided on the socket member 102, and a pawl provided on the lower end portion of a pair of leg portions 104b, 104b of the stopper 104 is engaged with an engaging projection provided on the socket member 102. Thereby, a lock portion 106 of the stopper 104 is engaged with an engaging portion 107 of the cylindrical nut member 103.

The above conventional terminal supporting device is configured such that the looseness of the cylindrical nut member 103 attached to the bracket 10 is prevented, by engaging the stopper 104 with the socket member 102 and the cylindrical nut member 103. Thus, there is no need of strengthening the biasing force of the coil spring 105, and the temporary fixation of the stopper 104 can be achieved easily at the operation site. However, there is a problem that the structure or operation for preventing the looseness of the cylindrical nut member 103 becomes complicated.

On the other hand, when the biasing force of the coil spring 105 is strengthened in order to dispense with means for preventing the looseness of the cylindrical nut member 103, the temporary fixation of the stopper 104 becomes difficult. Therefore, it is desired to simplify the structure or workability of the stopper 104 as much as possible (for example, JP 2002-122271 A).

However, in the case where the terminal supporting device 100 is configured to be attached to the bracket with preventing the rotation of the cylindrical nut member 103 in a loosening direction under the bias by strengthening the biasing force of the coil spring 105, the frictional force between the cylindrical nut member 103 and the stopper 104 is strong due to the bias in the state where the attachment of the terminal supporting device 100 to the bracket 110 is not performed yet. On the transportation of the terminal supporting device 100, the oscillation of the cylindrical nut member 103 in a rotating direction is caused by a vibration during the transportation and so on. The stopper 104 also oscillates by the transmission of the oscillation of the cylindrical nut member 103. Therefore, the stopper 104 might rise gradually and be detached, merely by interposing the stopper 104 between the socket member 102 and the cylindrical nut member 103. At this point, in prevention of the rotation of the cylindrical nut member 103 under the bias, the necessity of temporarily fixing the stopper 104 arises again at the operation site once the stopper 104 interposed between the socket member 102 and the cylindrical nut member 103 is detached. Therefore, some operators might be forced to perform a difficult operation due to the strong bias of the coil spring 105.

SUMMARY OF THE INVENTION

It is an object of the present invention to provide a terminal supporting device which a fixing operation of a cable terminal can be performed quickly and easily with a simple configuration.

The above object of the invention is achieved by a terminal supporting device for supporting a terminal of a cable by a bracket, comprising a main body having a tubular portion in which a male screw is formed on a periphery surface thereof and the cable is inserted inside thereof, a socket screwed onto the tubular portion so as to move back and forth relative to the tubular portion, a stopper fixed to the tubular portion to be opposed to the socket, a biasing member having a biasing force which gives the socket a torque in the direction approaching the stopper and prevents the loosening of the socket to sandwich the bracket between the socket and the stopper, and a lock member which keeps a distance between the socket and the stopper, wherein the lock member includes a lock body which is arranged movably between a lock position located between the socket and the stopper and a lock release position separated outwardly from a position located between the socket and the stopper, the lock body has a fitting projection, and the stopper has a fitting depression which fits with the fitting projection of the lock body at the lock position.

In this terminal supporting device, it is preferable that the fitting projection is positioned between one end and the other end in a periphery direction of the main body, because the oscillation due to the vibration can be prevented thereby and the gradual rise of the stopper is further prevented. Even in the case where the both ends of the lock body in the periphery direction are sandwiched with members for sliding which controls a detaching direction, it is necessary to provide a space between the lock body and the members for sliding such that the members for sliding can slide easily. Therefore, the fitting projection can further prevent the gradual rise of the stopper.

Further, it is preferable that the lock member has a pair of arm portions extending from the both sides of the lock body to sandwich the stopper, the arm portions have a sliding groove-like portion extending along the extending direction of the arm portions, and the stopper has a guide pin which fits to the sliding groove-like portion slidably.

Moreover, it is preferable that the fitting projection is formed such that the width of the portion fitting into the fitting depression at the side of the stopper is the same as or wider than that at the side of the socket.

In addition, it is preferable that the stopper has a protrusion on the surface opposed to the socket, the fitting depression is formed in a notch shape in a part of the protrusion, the lock member further has a catching block formed on the surface of the side facing the tubular portion in the lock member, and the catching block abuts on the protrusive end surface of the protrusion in the lock position.

According to the terminal supporting device of the present invention, it is possible that a fixing operation of a cable terminal is performed quickly and easily with a simple configuration.

DETAILED DESCRIPTION

Figure 1:
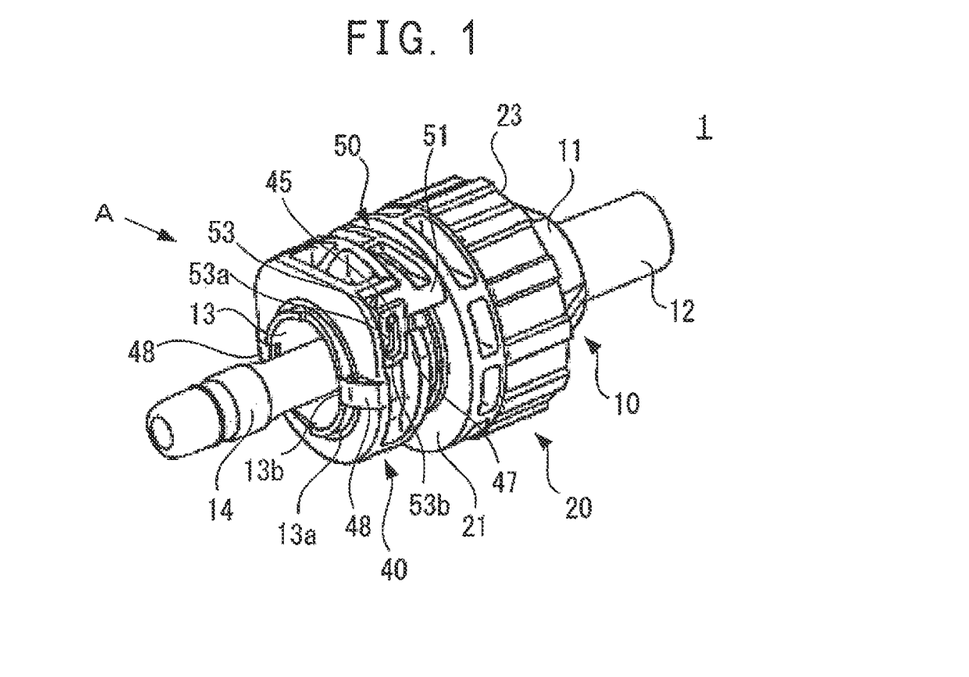
FIG. 1 is a perspective view of a terminal supporting device according to one embodiment of the present invention.
Figure 2:
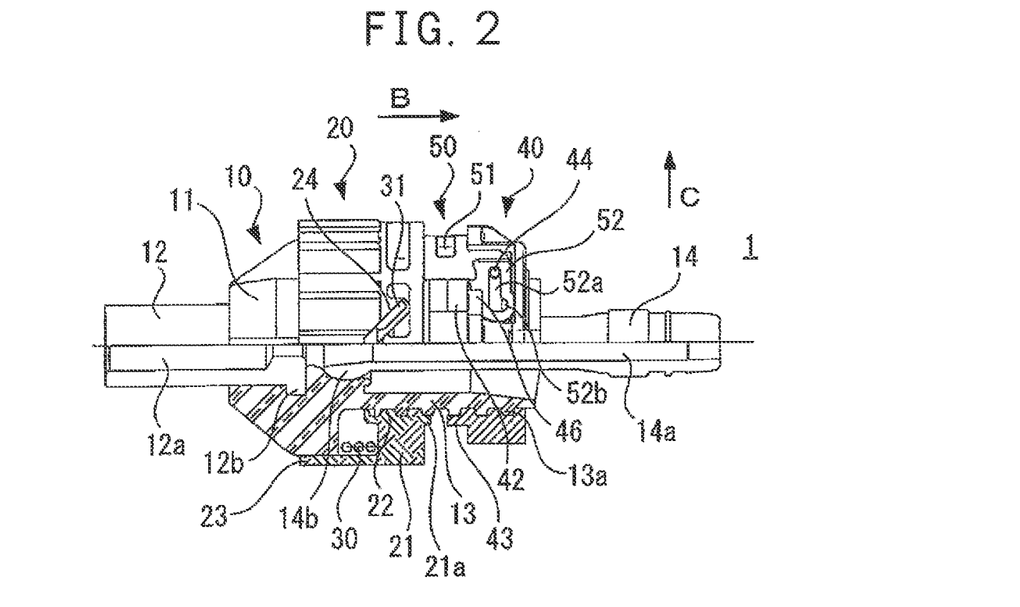
FIG. 2 is a side view of the device of FIG. 1 in a direction of arrow A.

Hereinafter, embodiments of the present invention will be explained with reference to the accompanying drawings. FIG. 1 is a perspective view of a terminal supporting device according to one embodiment of the present invention, and FIG. 2 is a side view of the device of FIG. 1 in a direction of arrow A. In FIG. 2, the bottom half of the figure is shown as a sectional view.

As shown in FIGS. 1 and 2, the terminal supporting device 1 comprises the main body 10, the socket 20, the biasing member 30, the stopper 40 and the lock member 50.

The main body 10 comprises a circularly cylindrical casing cap 12 and a tubular portion 13 which extend to the both sides from the center of the tubular base 11 with equally aligned along its axis line. In the tubular portion 13, a male screw 13a is formed over approximately the whole of the peripheral surface, and a guide pipe 14 is movably inserted inside the tubular portion. The casing cap 12 and the guide pipe 14 have hollow portions 12a and 14a which communicate to each other, and various cables (not shown) such as a control cable can be inserted into these hollow portions 12a and 14a. A flange portion 12b is formed at the insertion end of the casing cap 12, and the flange portion 12b is fixed in the base 11. Further, a spherical portion 14b is formed at the insertion end of the guide pipe 14. Such that the guide pipe 14 is swingable, a spherical portion 14b is supported in the inside of the base 11.

The socket 20 is a cylindrical member having a bottom-like portion which is formed with a through hole in the bottom. The socket 20 has a female screw in an internal circumference surface of a circular through hole 22 which is formed in the center of the bottom-like portion 21, and is screwed with the tubular portion 13 of the main body 10 movably. An opening 23 of the socket 20 is fitted onto the base 11 loosely by screwing the socket 20 at the tubular portion 13. Further, in the outer surface of the bottom portion 21 of the socket 20, a ring portion 21a is formed along the outer edge of the circular through hole 22. A catching slot 24 which catches a biasing member 30 described below is formed on the lateral surface of the socket 20.

Figure 3:
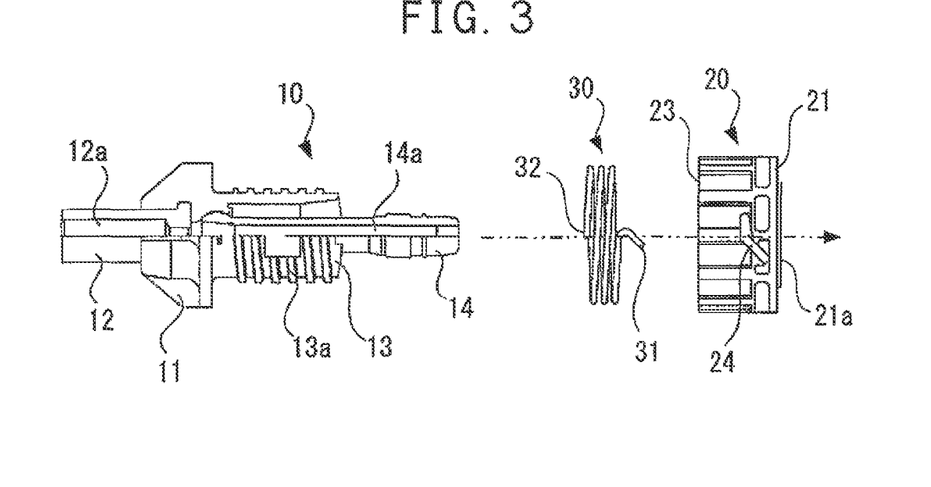
FIG. 3 is an assembly side view of a part of the terminal supporting device.

The biasing member 30 is composed of a recoil spring, and is interposed between the base 11 of the main body 10 and the bottom-like portion 21 of the socket 20. As shown in the assembly side view of FIG. 3, both end portions of the biasing member 30 are folded; one end portion 31 is caught to the catching slot 24 of the socket 20. The other end portion 32 being folded toward the center in the radial direction is caught to the tubular portion 13. By such an arrangement of the biasing member 30, the socket 20 is torqued so as to move toward the tip of the tubular portion 13, for the direction shown by the arrow B in FIG. 2. Additionally, in FIG. 3, the upper half of the main body 10 is shown in section.

Figure 4:
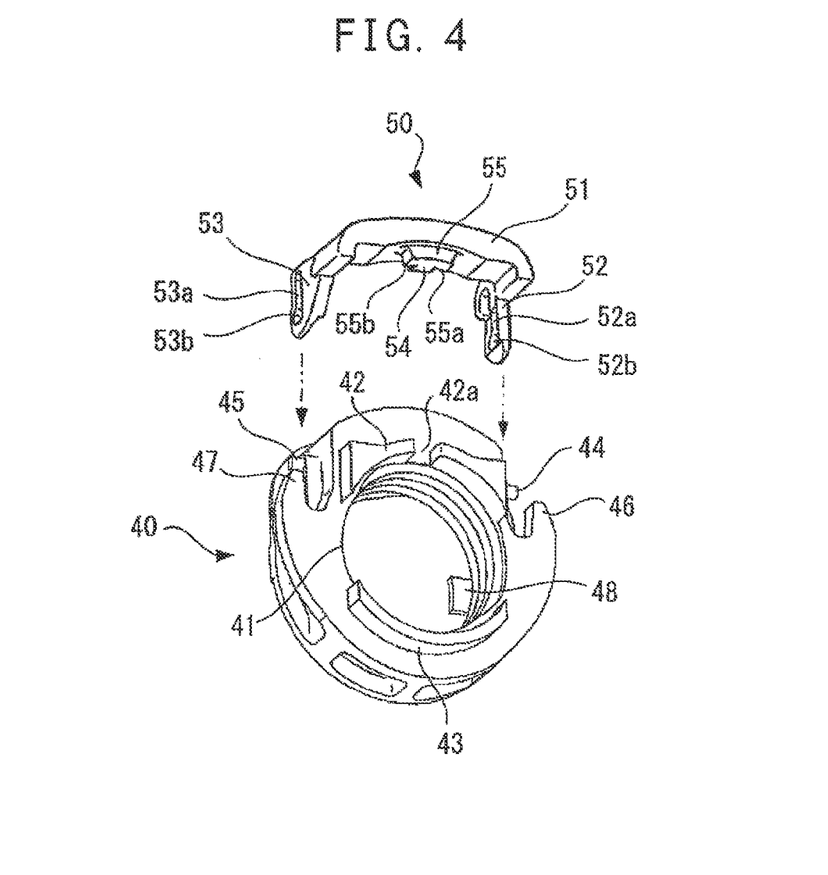
FIG. 4 is an assembly perspective view of another part of the terminal supporting device.

As shown in the assembly perspective view of FIG. 4, the stopper 40 formed in a ring shape has a female screw in the internal circumference surface of an opening portion 41, and is screwed with the tubular portion 13 where the socket 20 is screwed. The stopper 40 is arranged so as to be opposed to the outer surface of the bottom portion 21 of the socket 20 as shown in FIG. 2. In the surface opposed to the socket 20, the stopper 40 comprises a pair of protrusions 42 and 43 at the both sides holding the opening portion 41 therebetween. Each of protrusions 42 and 43 is provided along the rim of the opening portion 41. A fitting depression 42a is formed in a notch shape in the center of one protrusion 42. On the both sides to the rear side for this protrusion 42 in the FIG. 4, a pair of guide pins 44 and 45 which projects laterally is provided. Cover projections 46 and 47 are provided in the vicinity of each guide pins 44 and 45. In this embodiment, the fitting depression 42a is formed to pass through in the orthogonal direction of the protrusive direction of the protrusion 42, and the fitting depression 42a also can be formed in a bottomed shape where its bottom portion contacts with the fitting depression 54 described below.

Moreover, the stopper 40 comprises a plurality of catching pawls 48 (see FIG. 1) in the surface opposed to the socket 20, and the stopper 40 is fixed to the tip portion of the tubular portion 13 unrotatably by engaging these catching pawls 48 to the catching slot 13b formed on the tip edge of the tubular portion 13.

Figure 5:
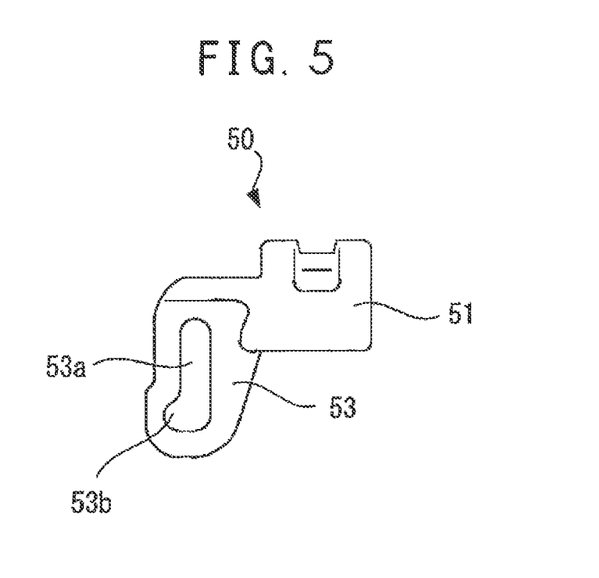
FIG. 5 is a side view of a lock member of the terminal supporting device.

As shown in FIG. 4, the lock member 50 comprises a lock body 51 which has a block-like form with a longitudinal shape curving gently along the periphery direction of the main body 10, and a pair of arm portions 52 and 53 which is coupled to the both ends of the lock body 51 in the periphery direction of the main body 10. The pair of arm portions 52 and 53 extends in the same direction in order to sandwich the stopper 40. As shown in FIGS. 4 and 5, sliding slots 52a and 53a, as a groove-like portion, extending along the extending direction of the arm portions are formed in the arm portions 52 and 53, and in the extending end sides of the arm portions 52 and 53, catching portions 52b and 53b are formed with an expanded slot width. Here, the extending end means the distal end of the arm portions, i.e. the farther end from the lock body 51 of the both ends of the arm portions. In the lock member 50, guide pins 44 and 45 of the stopper 40 are slidably fitted to each sliding slots 52a and 53a respectively. Though the sliding slots 52a and 53a are the penetration slots in this embodiment, they can also be configured to recessed slots.

The lock member 50 is configured such that the lock member 50 can be moved from the lock position in which the lock body 51 is interposed between the socket 20 and the stopper 40 as shown in FIG. 2 to the lock release position in which the lock body 51 is detached outwardly from the position which is located between the socket 20 and the stopper 40. In this case, when the lock body 51 is in the lock position the guide pins 44 and 45 contact the sliding slots 52a and 53a in the base end side of the arm portion, when the lock body 51 moves to the lock release position with the arise of the lock body 51 to the direction of the arrow C of the FIG. 2, the guide pins 44 and 45 contact the sliding slots 52a and 53a in the extending end sides of the arm portion. That is, the pair of arm portions 52 and 53 limits the movement of the lock member 50 from the lock position to the lock release position. Therefore, the sandwiching of the stopper 40 by the pair of arm portions 52 and 53 may not be firm with the easy sliding such that a small space exists between the pair of arms 52 and 53 and the stopper 40 for the easy attachment of the terminal supporting device to the bracket. Here, the base end refers to a proximal end of the arm portion, i.e. the nearer end from the lock body 51 of the both ends of the arm portion.

Figure 6:
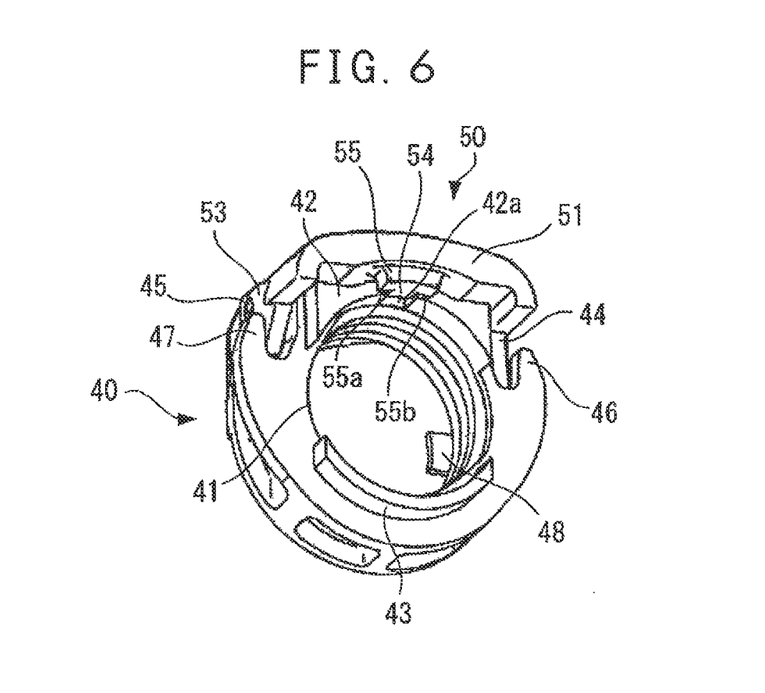
FIG. 6 is a perspective view showing a state after the assembling of FIG. 4.

In the lock body 51, the fitting projection 54 is provided on the surface where the lock body 51 faces the tubular portion 13 at the side of the opening portion 41 of the stopper 40, and as shown in the perspective view of FIG. 6, the fitting projection 54 fits into the fitting depression 42a of the stopper 40 when the lock member 50 is in the lock position. The lock body 51 further comprises a catching block 55 which is arranged adjacent to the fitting projection 54. The catching block 55 is wider than the fitting projection 54, and forms step portions 55a and 55b in the both sides to the fitting projection 54. The step portions 55a and 55b contact the protrusive end surface of the protrusion 42 in the lock position.

Next, the method of fixing the terminal of the cable with the terminal supporting device 1 comprising the above configuration will be explained. First of all, the socket 20 is rotated in the direction where the space between the socket 20 and the stopper 40 is expanded against the biasing force of the biasing member 30, the lock body 51 is placed so that the lock body 51 is interposed between the socket 20 and the stopper 40. As shown in FIGS. 1 and 2, the lock member 50 is set in the lock position beforehand. Thereby, a space depending on the thickness of the lock body 51 in the axial direction of the terminal supporting device 1 is formed between the ring 21a of the socket 20 and the protrusions 42 and 43 of the stopper 40.

The terminal supporting device 1 is transported to the operation site after the assembling. The biasing force from the socket 20 acts on the lock body 51 due to the biasing member 30. Thus when the socket 20 rotates minutely because of the vibration during the transportation or the like, the swinging force acts on the lock body 51 in the longitudinal direction. However, since the fitting projection 54 of the lock body 51 fits into the fitting depression 42a of the stopper 40 as shown in FIG. 6, the movement to the longitudinal direction is limited. As a result, the lock body 51 is prevented from rising outward gradually from between the socket 20 and the stopper 40, and it is possible to keep the lock member 50 at the lock position certainly.

Moreover, in the lock position, since the pair of arm portions 52 and 53 of the lock member 50 is covered with the cover projections 46 and 47 respectively, the collision of the pair of arm portions 52 and 53 with other members during the transportation is prevented, and the dropping of the lock member 50 from the stopper 40 is prevented certainly.

Figure 7:
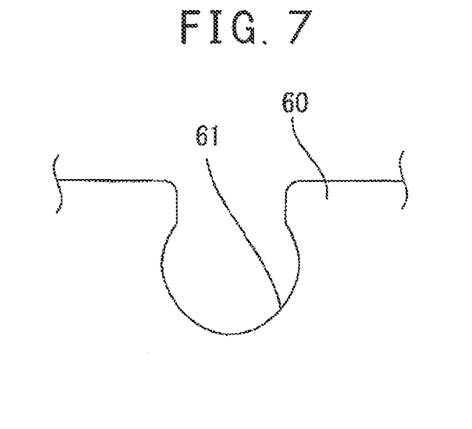
FIG. 7 is a plan view of a substantial part of a bracket where the terminal supporting device is attached.

In the operation site, the casing cap 12 and the guide pipe 14 are inserted into the terminal of the cable (not shown), and as shown in FIG. 7, the terminal supporting device 1 is attached from the above to the notch 61 which is formed on the upper edge of the plate-like bracket 60 with approximately U-shaped when seen from the flat surface such that the lock body 51 is to be the upper side of the terminal supporting device 1. Since a space is formed between the socket 20 and the stopper 40 due to the interposing of the lock body 51 as mentioned above, the bracket 60 can be inserted between the socket 20 and the stopper 40 smoothly by setting this space a slightly larger (for example, about 2 mm) than the board thickness of the bracket 60. After the lock body 51 contacts the lower portion of the notch 61, if the terminal supporting device 1 is further moved down, the lock body 51 is pushed up and the lock member 50 moves to the lock release position. As a result, the rim portion of the notch 61 of the bracket 60 is sandwiched between the ring 21a of the socket 20 and the protrusions 42 and 43 of the stopper 40, under the biasing force of the biasing member 30. In this way, the terminal of the cable can be supported by the bracket certainly.

As described above, according to the terminal supporting device 1 of this embodiment, since the fitting projection 54 of the lock body 51 is configured to fit into the fitting depression 42a of the stopper 40 at the state where the lock member 50 is at the lock position, there is less possibility that the lock member 50 moves unexpectedly during the transportation, and it is possible to keep the lock position of the lock member 50 certainly until the device is transported to the operation site. Therefore, in the operation site, an operator is released from the complicated operation for setting the lock member 50 from the lock release position to the lock position. Moreover, the necessity of stopping the loosening of the socket 20 is removed by strengthening the biasing force of the biasing member 30 enough. Thus, the workability can be improved dramatically, and the fixing operation of the cable terminal can be performed quickly and easily.

Further, in this embodiment, since the sliding slots 52a and 53a formed in the pair of arm portions 52 and 53 of the lock member 50 and the guide pins 44 and 45 of the stopper 40 are fitted slidably, the setting to the lock position or the movement to the lock release position of the lock member 50 can be performed easily and certainly. Because of the facility of the engagement/release of the lock, the lock member 50 tends to be affected by the rotation of the socket 20 under the vibration or the like, but the release of the lock can be prevented since the gradual rise of the lock member 50 is prevented due to the fitting mechanism by the fitting projection 54. Moreover, since the catching portions 52b and 53b of which slot widths are expanded at the extended end sides of the sliding slots 52a and 53a are formed, the lock member 50 becomes rotatable centering on the guide pins 44 and 45 when the guide pins 44 and 45 move to the catching portions 52b and 53b. Accordingly, it is possible to detach the lock member 50 from between the socket 20 and the stopper 40 certainly at the lock release position. It should be noted that the lock member 50 can be also configured not to have the pair of arm portions 52 and 53, and if the lock body 51 can move to the lock release position, it is further possible to adopt the method of guiding the lock member 50 to the lock release position depending on the handling of the lock member 50 after the release of the lock as applicable.

Figure 8:
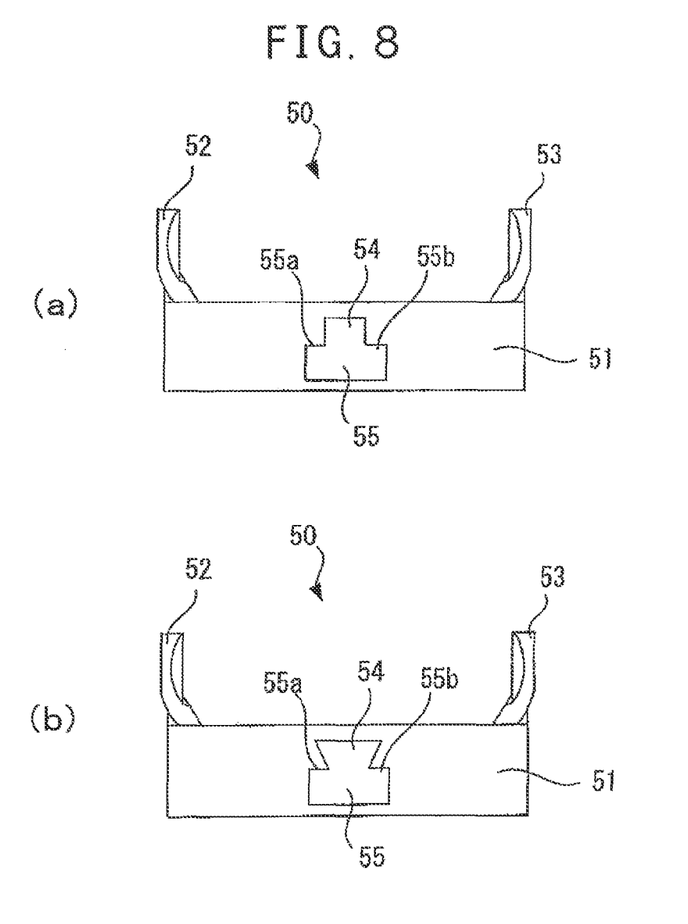
FIG. 8 is a plan view of a lock member of the terminal supporting device.

Though the shape of the fitting projection 54 is not limited especially, it is preferred to configure the fitting projection such that at least the both sides of the periphery direction of the fitting projection 54 tightly contacts with the inner wall surface of the fitting depression 42a at the fitting state, in order to limit the swing of the lock body 51 along the peripheral direction of the tubular portion 13. Moreover, because the lock body 51 receives the swinging force from the socket 20 by the vibration or the like, the lock body 51 is preferably formed such that the width of the portion fitting into the fitting depression 42a at the side of the stopper 40 becomes the same as or wider than that at the side of the socket 20. As an example, it is preferable to form the fitting projection 54 in a square shape shown in FIG. 8A or an obcuneate shape shown in FIG. 8B, when the fitting projection 54 is seen from the tubular portion 13 in the plane view. The fitting depression 42*a* is preferably formed in the same shape as the fitting projection 54. The height of the fitting projection 54 from the surface of the lock body 51 is constant across the board normally, but it is also possible to be tapered such that the height of the fitting projection 54 becomes higher at the stopper 40 side than at the socket 20 side.

Moreover, the position of the fitting projection 54 is not limited especially if the fitting projection 54 can be fitted into the fitting depression and is provided between the both ends of the peripheral direction of the lock body 51. However, it is preferable to arrange the fitting projection 54 in the intermediate position of the lock body 51 in the peripheral direction of the main body 10, because the fitting can the external force given to the lock body can be equalized. The fitting projection 54 in the intermediate position will also be fitted into the fitting depression easily. Additionally, the fitting projection 54 can be provided depending on the position where the fitting depression 42*a* is provided if the fitting projection 54 can be fitted into the fitting depression 42*a*. The fitting projection 54 can also be provided at the end portion of the stopper side of the lock body 51. However, it is preferable that the fitting projection depending on the position where the fitting depression 42*a* is provided on the surface facing the tubular portion of the main body, because the fitting projection can be easily fitted by pushing the fitting projection from the detaching position direction and the fitting depression 42*a* can be formed easily.

Further, in this embodiment, since the step portions 55*a* and 55*b* of the catching block 55 provided in the lock body 51 is configured to tightly contacts with the protrusive end surface of the protrusion 42 of the stopper 40, the frictional force can be generated between the catching block 55 and the stopper 40, thereby the swing of the lock member 50 during the transportation also can be caught. In the contacting surface of the catching block 55 or the protrusion 42, means to make the frictional force, for example concavity and convexity, can be formed in order to catch the lock member 50 more certainly. However, the catching block 55 is not essential in the present invention, and the configuration which prevents the movement of the lock member 50 by the fitting projection 54 only can be also provided.

The catching block 55 can be expected to have the effect of reinforcing the fitting projection 54, in addition to the effect of catching the lock member 50 as above, by arranging the catching block 55 in the vicinity of the fitting projection 54 to unite as this embodiment. However, it is possible to arrange the catching block 55 spaced from the fitting projection 54. It is also possible to employ the configuration where the whole catching block 55 contacts the protrusion 42.

What is claimed is:

1. A terminal supporting device for supporting a terminal of a cable by a bracket, said terminal supporting device comprising:
    a main body comprising a tubular portion in which a male screw is formed on a periphery surface thereof and wherein said cable is inserted inside thereof;
    a socket screwed onto said tubular portion so as to move back and forth in an axial direction relative to said tubular portion;
    a stopper fixed to said tubular portion to be opposed to said socket;
    a biasing member comprising a biasing force which gives said socket a torque in a direction approaching said stopper and prevents a loosening of said socket to sandwich said bracket between said socket and said stopper; and
    a lock member which keeps a distance between said socket and said stopper,
    wherein said lock member comprises a lock body releasably interposed between said stopper and said socket, wherein said socket is rotated against said biasing force of said biasing member so as to expand a space between said socket and said stopper, and wherein said lock body is arranged movably between a lock position located between said socket and said stopper and a lock release position separated outwardly from a position located between said socket and said stopper, wherein said lock body comprises a fitting projection, and wherein said stopper comprises a fitting depression which fits with said fitting projection of said lock body at said lock position.

2. The terminal supporting device according to claim 1, wherein said fitting projection is positioned between one end and another end of said lock body in a periphery direction of said main body.

3. The terminal supporting device according to claim 1, wherein said lock member comprises a pair of arm portions extending from both sides of said lock body to sandwich said stopper, wherein said pair of arm portions comprise a sliding groove-like portion extending along an extending direction of said pair of arm portions, and wherein said stopper comprises a guide pin which fits to said sliding groove-like portion slidably.

4. The terminal supporting device according to claim 1, wherein said fitting projection is formed such that a width of a portion fitting into said fitting depression at a stopper side is equal to or wider than that at a socket side.

5. The terminal supporting device according to claim 1,
    wherein said stopper comprises a protrusion on a surface opposed to said socket,
    wherein said fitting depression is formed in a notch shape in a part of said protrusion,
    wherein said lock member comprises a catching block formed on a surface thereof,
    wherein said surface of said lock member faces said tubular portion, and
    wherein said catching block abuts on a surface of a protrusive end of said protrusion in said lock position.

6. The terminal supporting device according to claim 2, wherein said lock member comprises a pair of arm portions extending from both sides of said lock body to sandwich said stopper, wherein said pair of arm portions comprise a sliding groove-like portion extending along an extending direction of said pair of arm portions, and wherein said stopper comprises a guide pin which fits to said sliding groove-like portion slidably.

7. The terminal supporting device according to claim 2, wherein said fitting projection is formed such that a width of a portion fitting into said fitting depression at a stopper side is equal to or wider than that at a socket side.

8. The terminal supporting device according to claim 3, wherein said fitting projection is formed such that a width of a portion fitting into said fitting depression at a stopper side is equal to or wider than that at a socket side.

9. The terminal supporting device according claim 2,
    wherein said stopper comprises a protrusion on a surface opposed to said socket,
    wherein said fitting depression is formed in a notch shape in a part of said protrusion,
    wherein said lock member comprises a catching block formed on a surface thereof,
    wherein said surface of said lock member faces said tubular portion, and wherein said catching block abuts on a surface of a protrusive end of said protrusion in said lock position.

10. The terminal supporting device according claim 3,
wherein said stopper comprises a protrusion on a surface opposed to said socket,
wherein said fitting depression is formed in a notch shape in a part of said protrusion,
wherein said lock member comprises a catching block formed on a surface thereof,
wherein said surface of said lock member faces said tubular portion, and
wherein said catching block abuts on a surface of a protrusive end of said protrusion in said lock position.

11. The terminal supporting device according claim 4,
wherein said stopper comprises a protrusion on a surface opposed to said socket,
wherein said fitting depression is formed in a notch shape in a part of said protrusion,
wherein said lock member comprises a catching block formed on a surface thereof,
wherein said surface of said lock member faces said tubular portion, and
wherein said catching block abuts on a surface of a protrusive end of said protrusion in said lock position.

12. A terminal supporting device for supporting a terminal of a cable by a bracket, said terminal supporting device comprising:
a main body comprising a tubular portion in which a male screw is formed on a periphery surface thereof and wherein said cable is inserted inside thereof;
a socket screwed onto said tubular portion so as to move back and forth relative to said tubular portion;
a stopper fixed to said tubular portion to be opposed to said socket;
a biasing member comprising a biasing force which gives said socket a torque in a direction approaching said stopper and prevents a loosening of said socket to sandwich said bracket between said socket and said stopper; and
a lock member which keeps a distance between said socket and said stopper,
wherein said lock member comprises a lock body arranged movably between a lock position located between said socket and said stopper and a lock release position separated outwardly from a position located between said socket and said stopper,
wherein said lock body comprises a fitting projection,
wherein said stopper comprises a fitting depression which fits with said fitting projection of said lock body at said lock position,
wherein said stopper comprises a protrusion on a surface opposed to said socket,
wherein said fitting depression is formed in a notch shape in a part of said protrusion,
wherein said lock member comprises a catching block formed on a surface thereof,
wherein said surface of said lock member faces said tubular portion, and
wherein said catching block abuts on a surface of a protrusive end of said protrusion in said lock position.

13. The terminal supporting device according to claim 12, wherein said fitting projection is positioned between one end and another end of said lock body in a periphery direction of said main body.

14. The terminal supporting device according to claim 12, wherein said lock member comprises a pair of arm portions extending from both sides of said lock body to sandwich said stopper, wherein said pair of arm portions comprise a sliding groove-like portion extending along an extending direction of said pair of arm portions, and wherein said stopper comprises a guide pin which fits to said sliding groove-like portion slidably.

15. The terminal supporting device according to claim 12, wherein said fitting projection is formed such that a width of a portion fitting into said fitting depression at a stopper side is equal to or wider than that at a socket side.

16. A terminal supporting device for supporting a terminal of a cable by a bracket, said terminal supporting device comprising:
a main body comprising a tubular portion in which a male screw is formed on a periphery surface thereof and wherein said cable is inserted inside thereof;
a socket screwed onto said tubular portion so as to move back and forth relative to said tubular portion;
a stopper fixed to said tubular portion to be opposed to said socket;
a biasing member comprising a biasing force which gives said socket a torque in a direction approaching said stopper and prevents a loosening of said socket to sandwich said bracket between said socket and said stopper; and
a lock member which keeps a distance between said socket and said stopper,
wherein said lock member comprises a lock body arranged movably between a lock position located between said socket and said stopper and a lock release position separated outwardly from a position located between said socket and said stopper,
wherein said lock body comprises a fitting projection,
wherein said stopper comprises a fitting depression which fits with said fitting projection of said lock body at said lock position,
wherein said fitting projection is positioned between one end and another end of said lock body in a periphery direction of said main body,
wherein said stopper comprises a protrusion on a surface opposed to said socket,
wherein said fitting depression is formed in a notch shape in a part of said protrusion,
wherein said lock member comprises a catching block formed on a surface thereof,
wherein said surface of said lock member faces said tubular portion, and
wherein said catching block abuts on a surface of a protrusive end of said protrusion in said lock position.

17. The terminal supporting device according to claim 16, wherein said lock member comprises a pair of arm portions extending from both sides of said lock body to sandwich said stopper, wherein said pair of arm portions comprise a sliding groove-like portion extending along an extending direction of said pair of arm portions, and wherein said stopper comprises a guide pin which fits to said sliding groove-like portion slidably.

18. The terminal supporting device according to claim 16, wherein said fitting projection is formed such that a width of a portion fitting into said fitting depression at a stopper side is equal to or wider than that at a socket side.

* * * * *